US010568128B2

(12) United States Patent
Li et al.

(10) Patent No.: US 10,568,128 B2
(45) Date of Patent: Feb. 18, 2020

(54) TECHNIQUES AND APPARATUSES FOR SCHEDULING REQUEST ACKNOWLEDGEMENT

(71) Applicant: QUALCOMM Incorporated, San Diego, CA (US)

(72) Inventors: Chih-Ping Li, San Diego, CA (US); Wanshi Chen, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/005,405

(22) Filed: Jun. 11, 2018

(65) Prior Publication Data

US 2018/0368172 A1 Dec. 20, 2018

Related U.S. Application Data

(60) Provisional application No. 62/519,598, filed on Jun. 14, 2017.

(51) Int. Cl.
*H04W 72/14* (2009.01)
*H04L 1/18* (2006.01)
*H04W 72/12* (2009.01)

(52) U.S. Cl.
CPC ........... *H04W 72/14* (2013.01); *H04L 1/1812* (2013.01); *H04W 72/1284* (2013.01)

(58) Field of Classification Search
CPC .. H04W 72/14; H04W 72/1284; H04L 1/1812
See application file for complete search history.

(56) References Cited

U.S. PATENT DOCUMENTS 9,173,203 B2 10/2015 Susitaival et al.
9,723,618 B2 8/2017 Loehr et al.
(Continued)

FOREIGN PATENT DOCUMENTS

EP 1871057 A1 12/2007
WO WO-2015100377 A1 7/2015

OTHER PUBLICATIONS

Nokia, et al., "Dynamic Scheduling based Transmission for URLLC", 3GPP Draft; R1-1705245_URLLC_GRANT BASED_FINAL, 3rd Generation Partnership Project (3GPP), Mobile Competence Centre; 650, Route Des Lucioles; F-06921 Sophia-Antipolis Cedex; France, vol. RAN WG1, No. Spokane, WA, USA; Apr. 3, 2017-Apr. 7, 2017, Apr. 2, 2017 (Apr. 2, 2017), 5 Pages, XP051243376, Retrieved from the Internet: URL: http://www.3gpp.org/ftp/Meetings_3GPP_SYNC/RAN1/Docs/ [retrieved on Apr. 2, 2017].
(Continued)

*Primary Examiner* — Mohammad S Anwar
(74) *Attorney, Agent, or Firm* — Harrity & Harrity, LLP

(57) ABSTRACT

Certain aspects of the present disclosure generally relate to wireless communication. In some aspects, a user equipment may transmit a scheduling request to a base station. In some aspects, the user equipment may monitor for an ultra-reliable low latency communications type of response message from the base station based at least in part on transmitting the scheduling request to the base station, wherein the response message includes an indicator of an assignment of uplink resources for the user equipment or that the assignment of uplink resources is delayed, and wherein, based at least in part on the monitoring, the user equipment avoids retransmission of the scheduling request when the response message is detected or retransmits the scheduling request without delay when the response message is not detected. Numerous other aspects are provided.

30 Claims, 10 Drawing Sheets

(56) References Cited

U.S. PATENT DOCUMENTS

| | | | |
|---|---|---|---|
| 10,123,316 B2* | 11/2018 | Freda | H04W 72/0406 |
| 2009/0196366 A1* | 8/2009 | Shen | H04L 5/0053 |
| | | | 375/260 |
| 2011/0081939 A1* | 4/2011 | Damnjanovic | H04W 52/08 |
| | | | 455/522 |
| 2011/0206020 A1* | 8/2011 | Hollick | H04W 72/005 |
| | | | 370/337 |
| 2012/0057449 A1* | 3/2012 | Takaoka | H04B 1/713 |
| | | | 370/210 |
| 2012/0263047 A1* | 10/2012 | Love | H04W 72/00 |
| | | | 370/252 |
| 2016/0157256 A1 | 6/2016 | Tseng | |
| 2017/0310431 A1* | 10/2017 | Iyer | H04L 1/1816 |
| 2018/0014322 A1 | 1/2018 | Loehr et al. | |
| 2018/0020365 A1 | 1/2018 | Xiong et al. | |

OTHER PUBLICATIONS

International Search Report and Written Opinion—PCT/US2018/037040—ISA/EPO—dated Sep. 7, 2018.

* cited by examiner

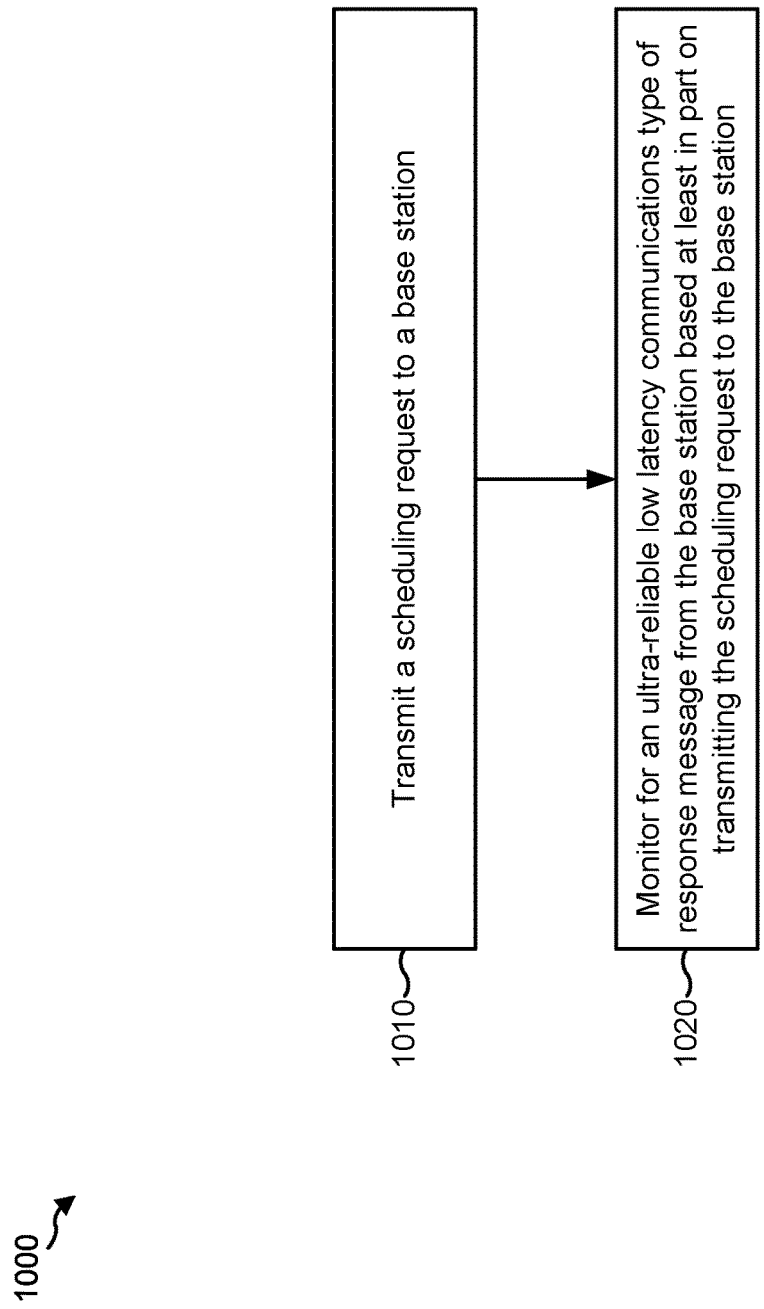

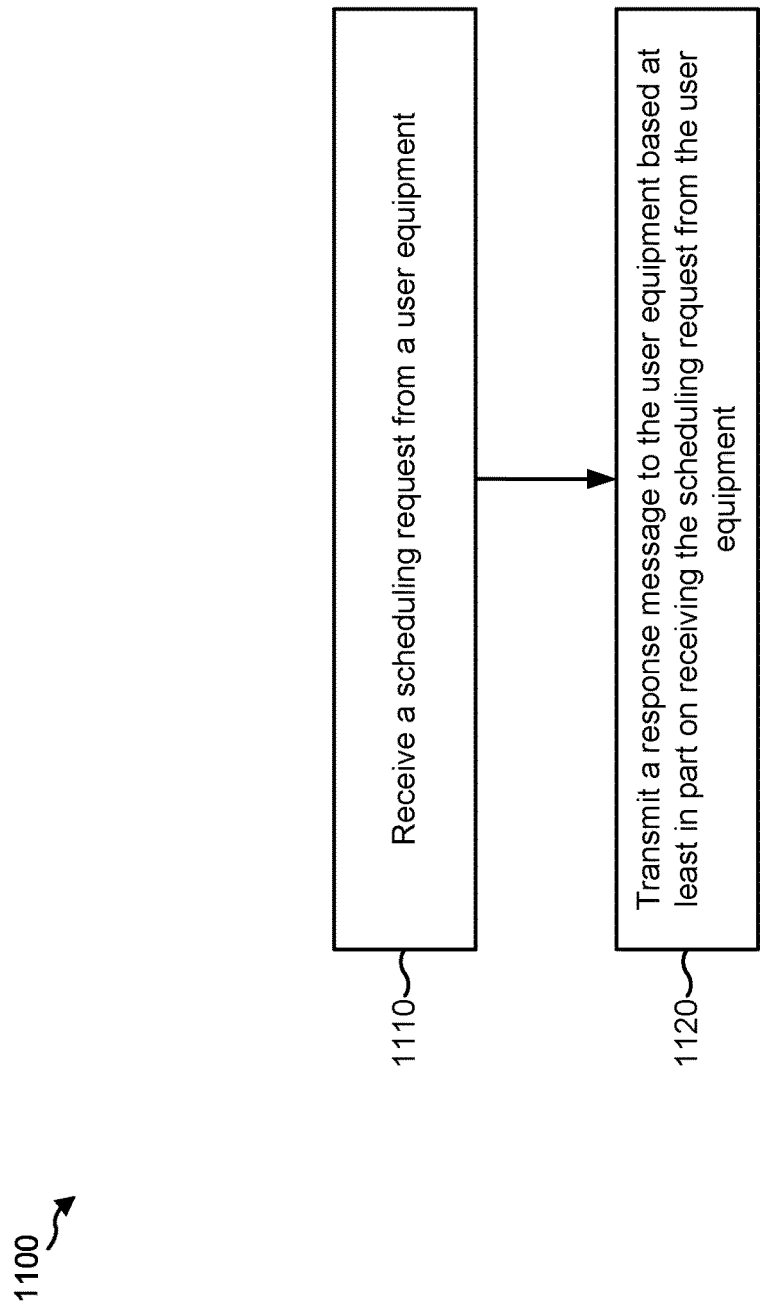

TECHNIQUES AND APPARATUSES FOR SCHEDULING REQUEST ACKNOWLEDGEMENT

CROSS-REFERENCE TO RELATED APPLICATIONS UNDER 35 U.S.C. § 119

This application claims priority to Provisional Patent Application No. 62/519,598, filed on Jun. 14, 2017, entitled "TECHNIQUES AND APPARATUSES FOR SCHEDULING REQUEST ACKNOWLEDGEMENT," which is hereby expressly incorporated by reference herein.

FIELD OF THE DISCLOSURE

Aspects of the present disclosure generally relate to wireless communication, and more particularly to techniques and apparatuses for scheduling request acknowledgement.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a user equipment may include transmitting a scheduling request to a base station. The method may include monitoring for an ultra-reliable low latency communications type of response message from the base station based at least in part on transmitting the scheduling request to the base station, wherein the response message includes an indicator of an assignment of uplink resources for the user equipment or that the assignment of uplink resources is delayed, and wherein, based at least in part on the monitoring, the user equipment avoids retransmission of the scheduling request when the response message is detected or retransmits the scheduling request without delay when the response message is not detected.

In some aspects, a user equipment for wireless communication may include a memory and one or more processors configured to transmit a scheduling request to a base station. The memory and the one or more processors may be configured to monitor for an ultra-reliable low latency communications type of response message from the base station based at least in part on transmitting the scheduling request to the base station, wherein the response message includes an indicator of an assignment of uplink resources for the user equipment or that the assignment of uplink resources is delayed, and wherein, based at least in part on the monitoring, the user equipment avoids retransmission of the scheduling request when the response message is detected or retransmits the scheduling request without delay when the response message is not detected.

In some aspects, a non-transitory computer-readable medium may store one or more instructions for wireless communication. The one or more instructions, when executed by one or more processors of a user equipment, may cause the one or more processors to transmit a scheduling request to a base station. The one or more instructions, when executed by the one or more processors, may cause the one or more processors to monitor for an ultra-reliable low latency communications type of response message from the base station based at least in part on transmitting the scheduling request to the base station, wherein the response message includes an indicator of an assignment of uplink resources for the user equipment or that the assignment of uplink resources is delayed, and wherein, based at least in part on the monitoring, the user equipment avoids retransmission of the scheduling request when the response message is detected or retransmits the scheduling request without delay when the response message is not detected.

In some aspects, an apparatus for wireless communication may include means for transmitting a scheduling request to a base station. The apparatus may include means for monitoring for an ultra-reliable low latency communications type of response message from the base station based at least in part on transmitting the scheduling request to the base station, wherein the response message includes an indicator of an assignment of uplink resources for the apparatus or that the assignment of uplink resources is delayed, and wherein, based at least in part on the monitoring, the apparatus avoids retransmission of the scheduling request when the response message is detected or retransmits the scheduling request without delay when the response message is not detected.

In some aspects, a method for wireless communication performed by a base station may include receiving a scheduling request from a user equipment. The method may include transmitting a response message to the user equipment based at least in part on receiving the scheduling request from the user equipment, wherein the response message includes an indicator indicating an assignment of uplink resources or that an assignment of uplink resources is to be provided after the response message is provided, and wherein the response message includes an indicator indicating an assignment of uplink resources or that an assignment of uplink resources is to be provided after the response message is provided.

In some aspects, a base station for wireless communication may include a memory and one or more processors configured to receive a scheduling request from a user equipment. The memory and the one or more processors may be configured to transmit a response message to the user equipment based at least in part on receiving the scheduling request from the user equipment, wherein the response message includes an indicator indicating an assignment of uplink resources or that an assignment of uplink resources is to be provided after the response message is provided, and wherein the response message includes an indicator indicating an assignment of uplink resources or that an assignment of uplink resources is to be provided after the response message is provided.

In some aspects, a non-transitory computer-readable medium may store one or more instructions for wireless communication. The one or more instructions, when executed by one or more processors of a base station, may cause the one or more processors to receive a scheduling request from a user equipment. The one or more instructions, when executed by the one or more processors, may cause the one or more processors to transmit a response message to the user equipment based at least in part on receiving the scheduling request from the user equipment, wherein the response message includes an indicator indicating an assignment of uplink resources or that an assignment of uplink resources is to be provided after the response message is provided, and wherein the response message includes an indicator indicating an assignment of uplink resources or that an assignment of uplink resources is to be provided after the response message is provided.

In some aspects, an apparatus for wireless communication may include means for receiving a scheduling request from a user equipment. The apparatus may include means for transmitting a response message to the user equipment based at least in part on receiving the scheduling request from the user equipment, wherein the response message includes an indicator indicating an assignment of uplink resources or that an assignment of uplink resources is to be provided after the response message is provided, and wherein the response message includes an indicator indicating an assignment of uplink resources or that an assignment of uplink resources is to be provided after the response message is provided.

Aspects generally include a method, apparatus, system, computer program product, user equipment, wireless communication device, mobile device, base station, access point, gNB, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is a diagram illustrating an example process performed, for example, by a user equipment, in accordance with various aspects of the present disclosure.

FIG. 11 is a diagram illustrating an example process performed, for example, by a base station, in accordance with various aspects of the present disclosure.

DETAILED DESCRIPTION

Figure 1:
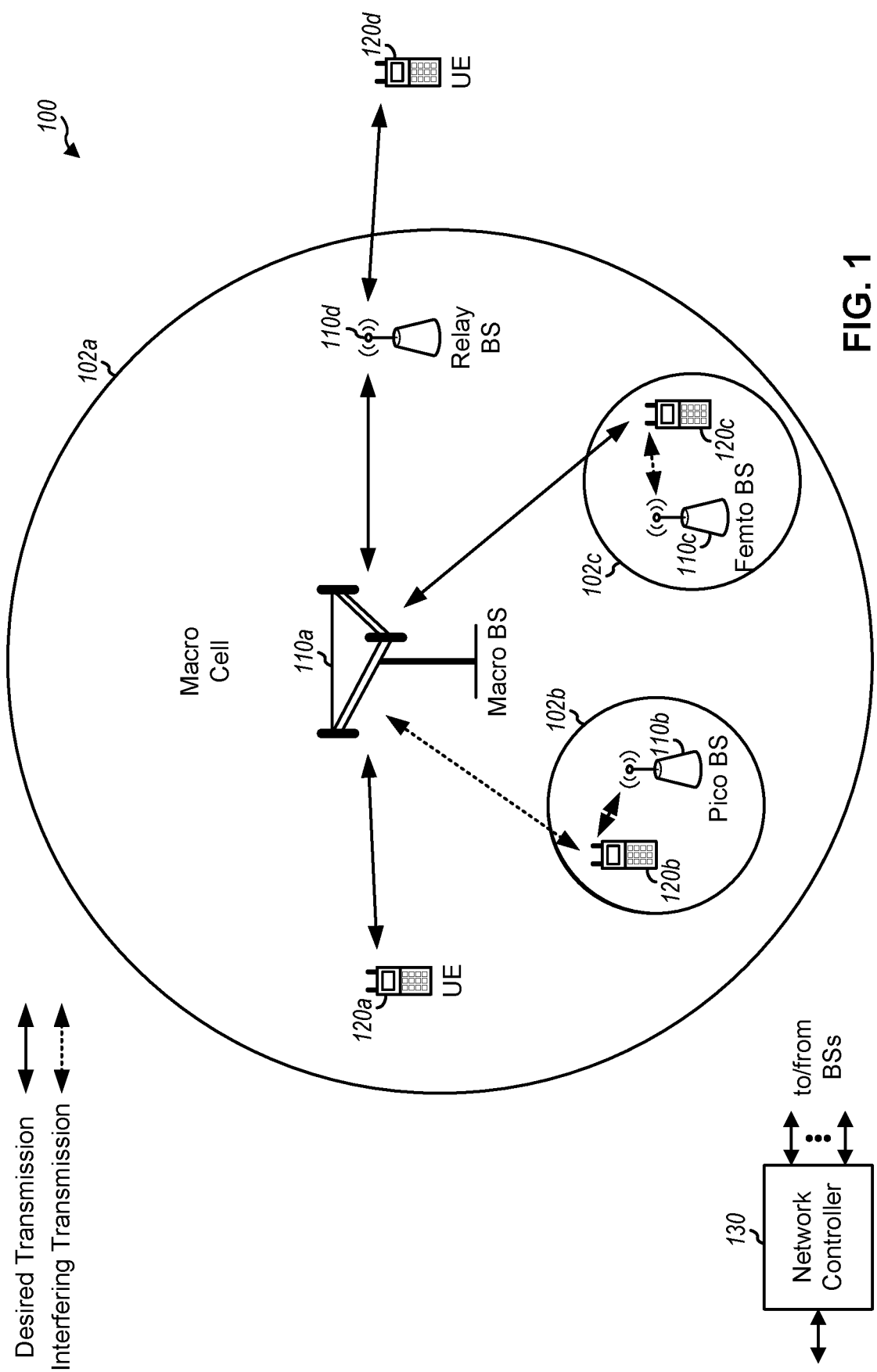
FIG. 1 is a block diagram conceptually illustrating an example of a wireless communication network, in accordance with certain aspects of the present disclosure.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect. Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing that houses components of UE 120, such as processor components, memory components, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
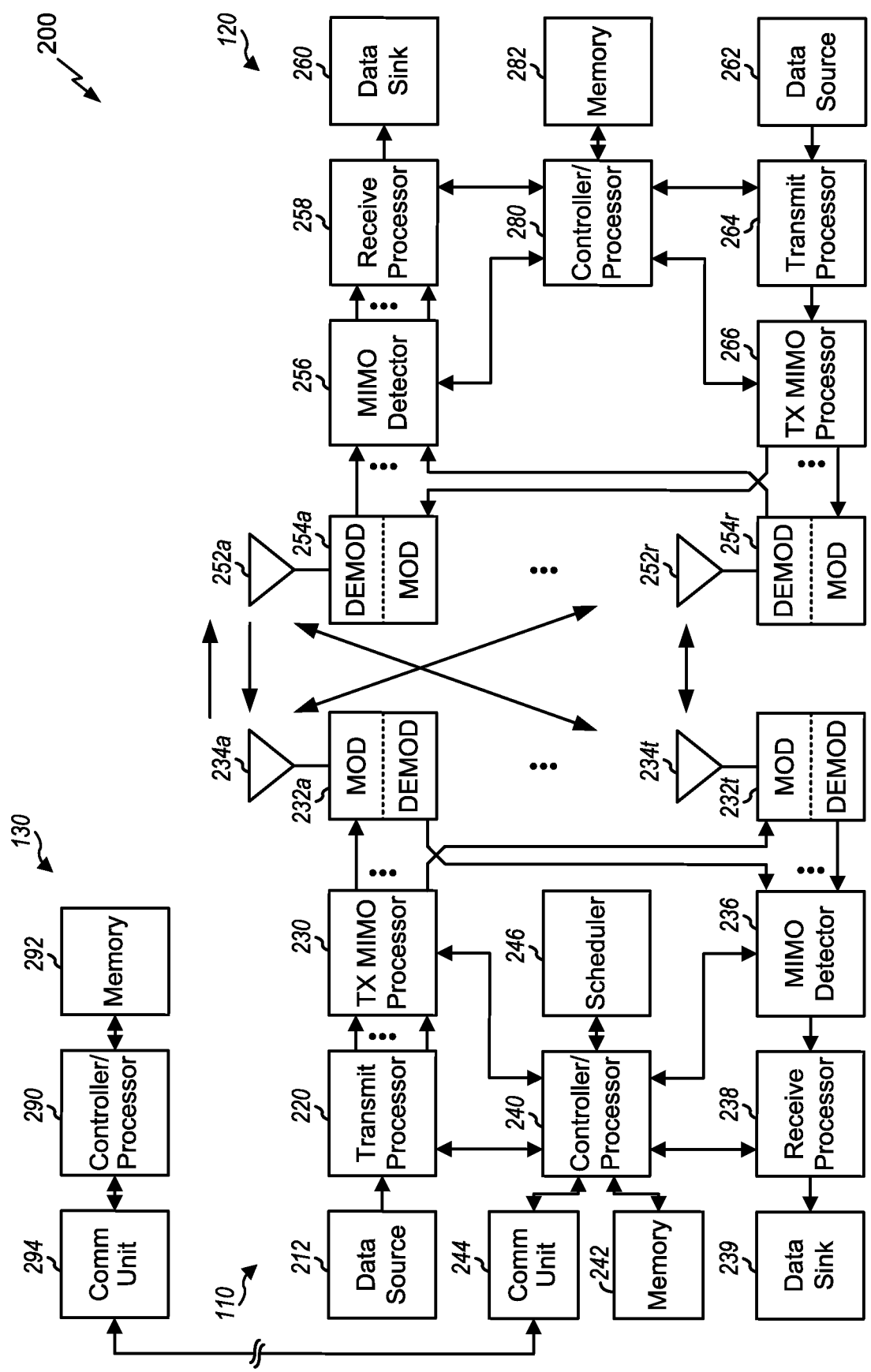
FIG. 2 shows a block diagram conceptually illustrating an example of a base station in communication with a user equipment (UE) in a wireless communication network, in accordance with certain aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with scheduling request acknowledge and/or uplink acquisition, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for transmitting a scheduling request to a base station, means for monitoring for an ultra-reliable low latency communications type of response message from the base station based at least in part on transmitting the scheduling request to the base station, and/or the like. In some aspects, such means may include one or more components of UE 120 described in connection with FIG. 2.

In some aspects, base station 110 may include means for receiving a scheduling request from a user equipment, means for transmitting a response message to the user equipment based at least in part on receiving the scheduling request from the user equipment, and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3:
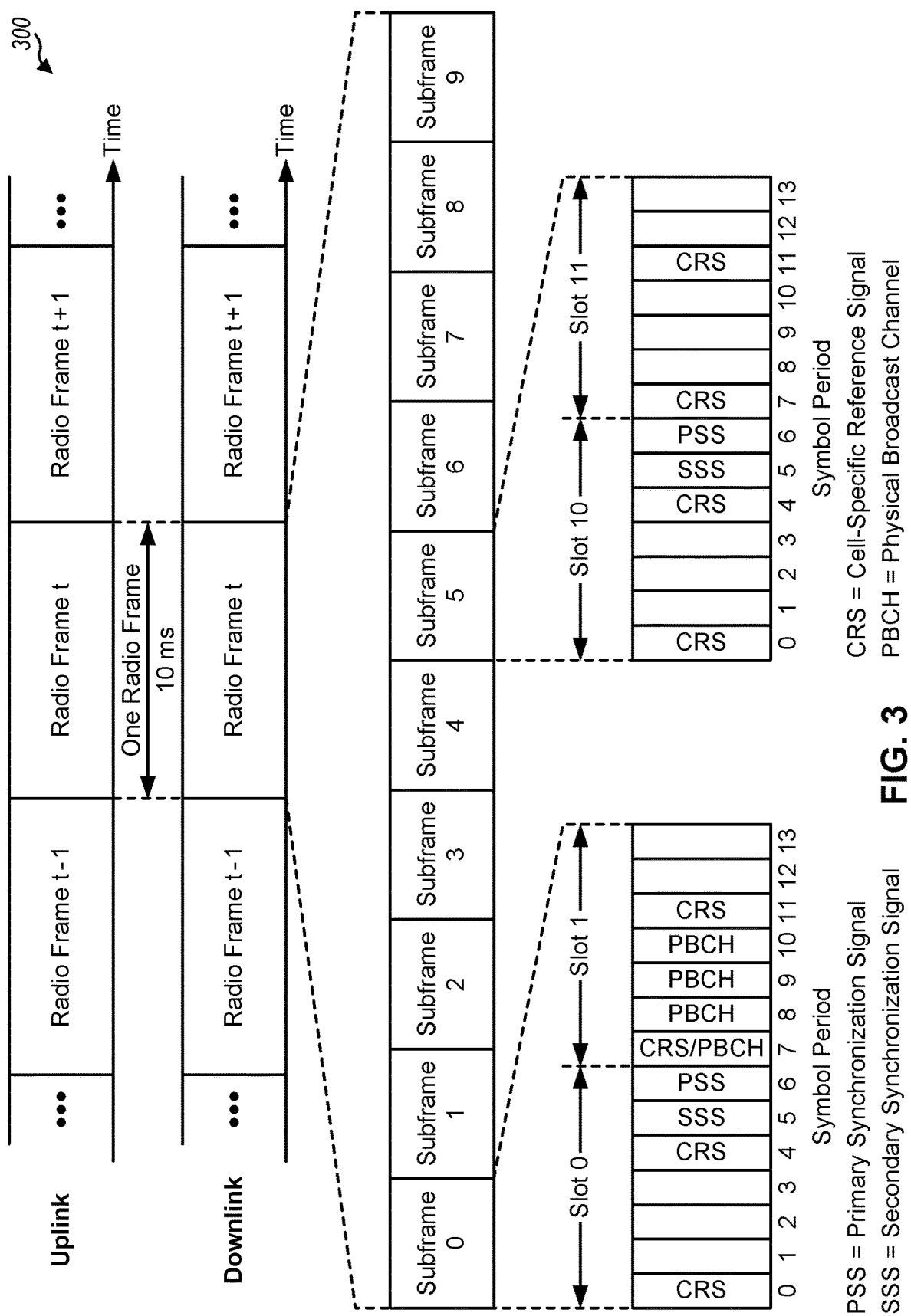
FIG. 3 is a block diagram conceptually illustrating an example of a frame structure in a wireless communication network, in accordance with certain aspects of the present disclosure.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
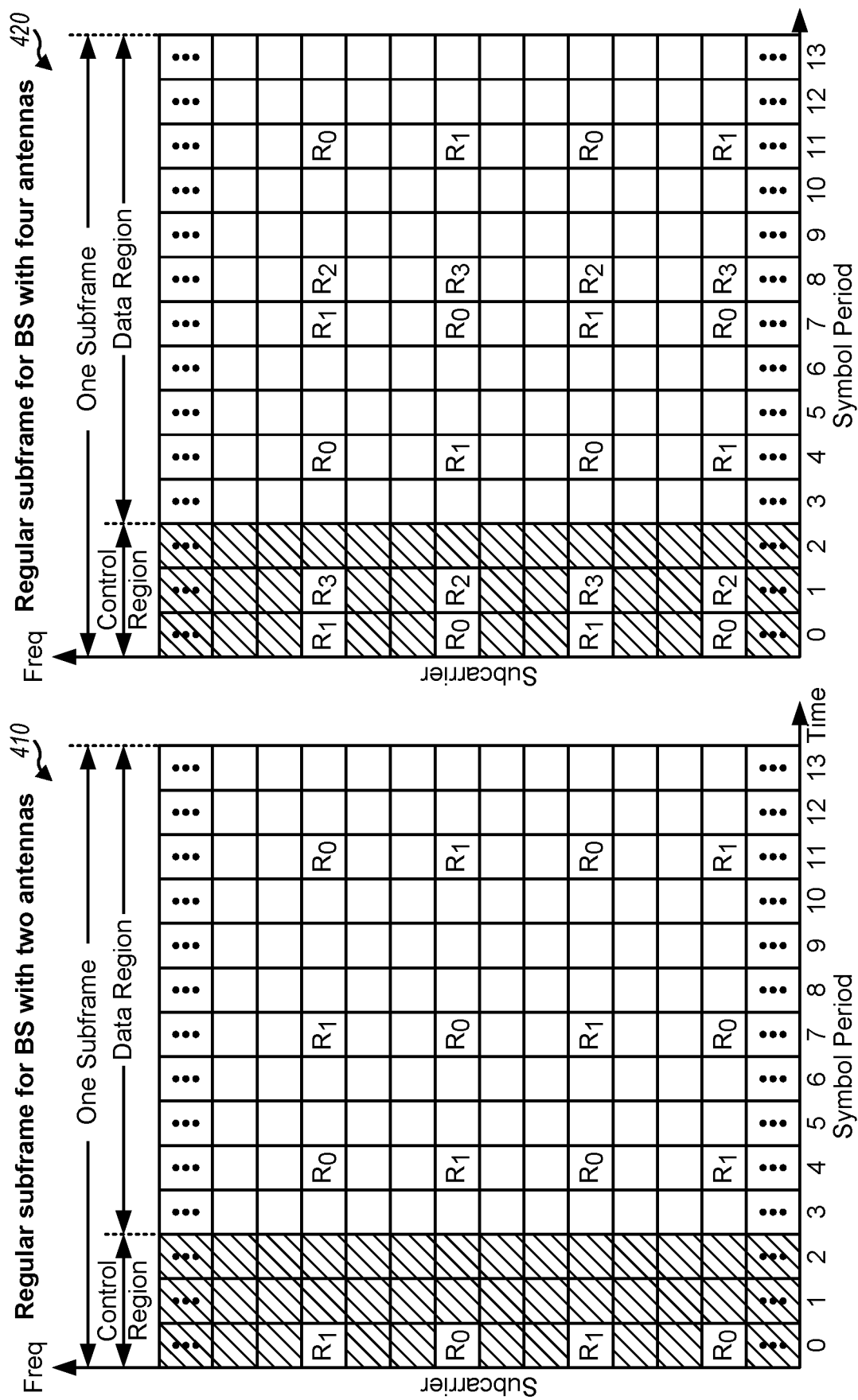
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
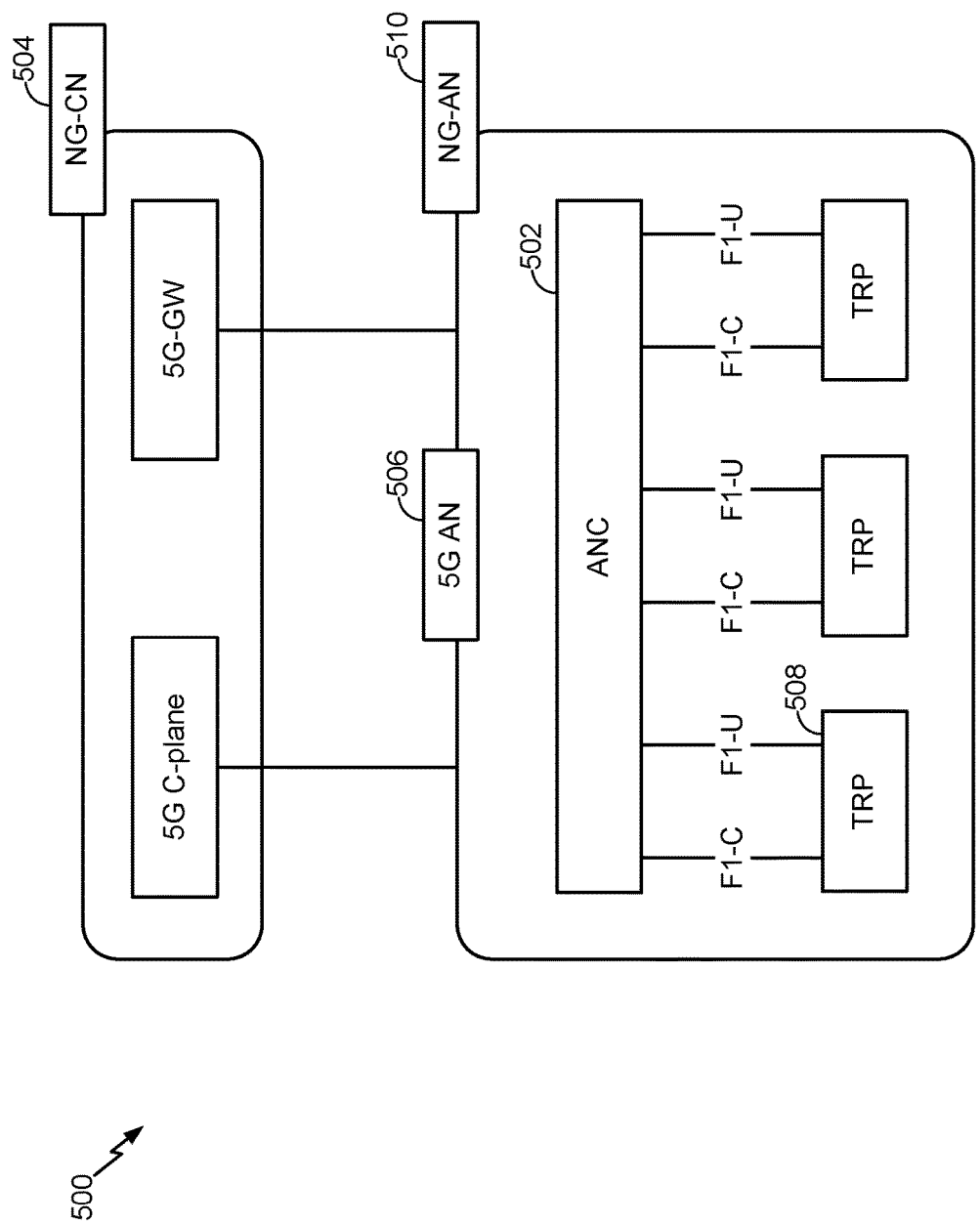
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
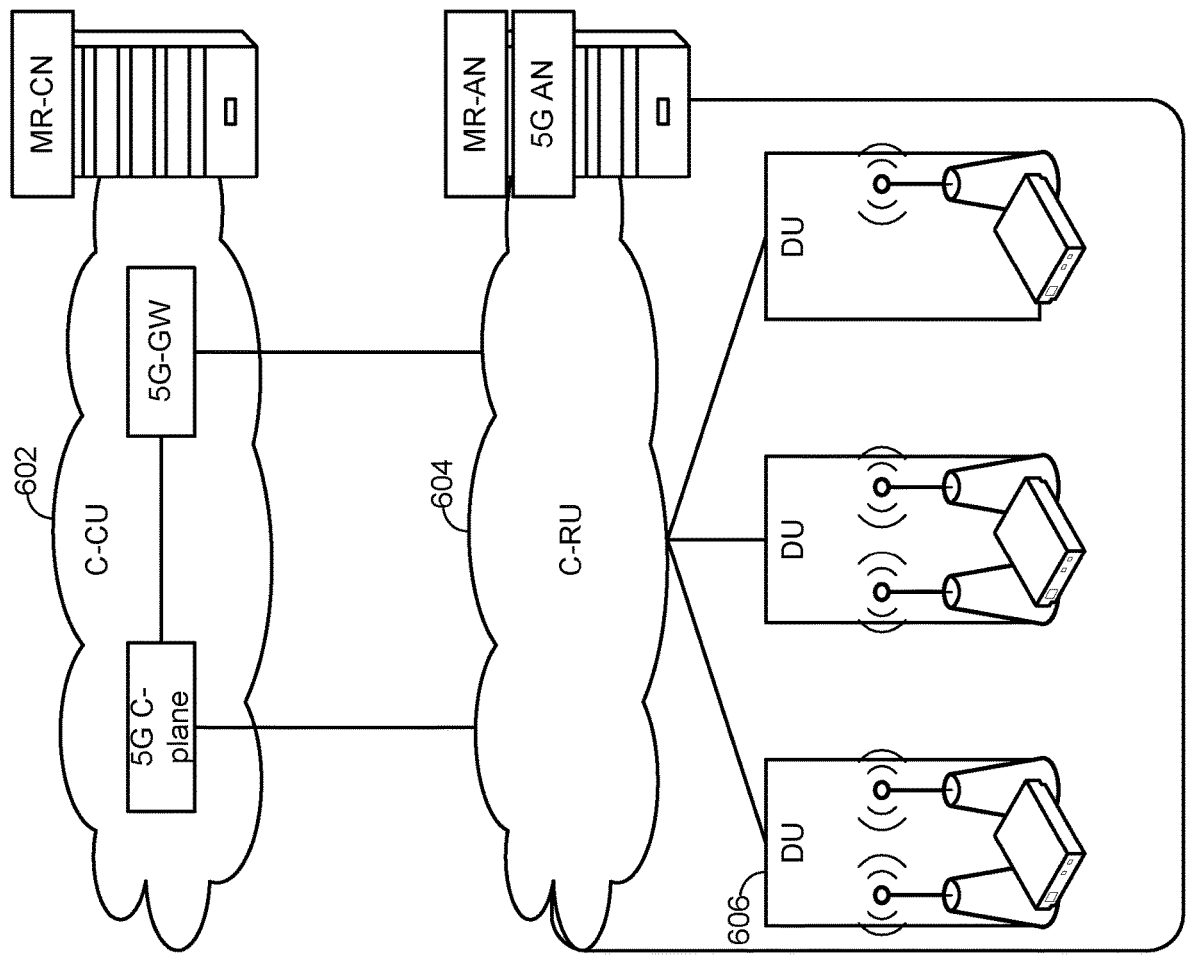
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
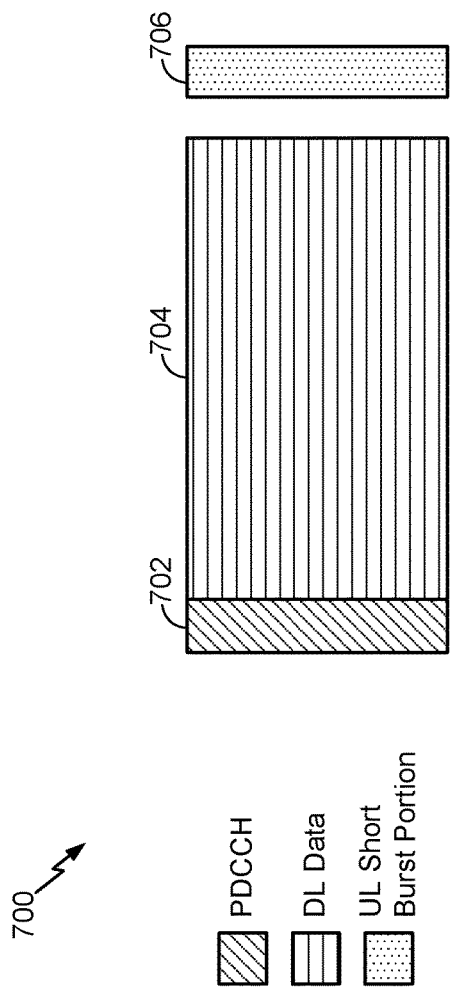
FIG. 7 is a diagram illustrating an example of a downlink (DL)-centric subframe, in accordance with certain aspects of the present disclosure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), acknowledgement messages, and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR) (e.g., a scheduling request transmission or a scheduling request retransmission), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
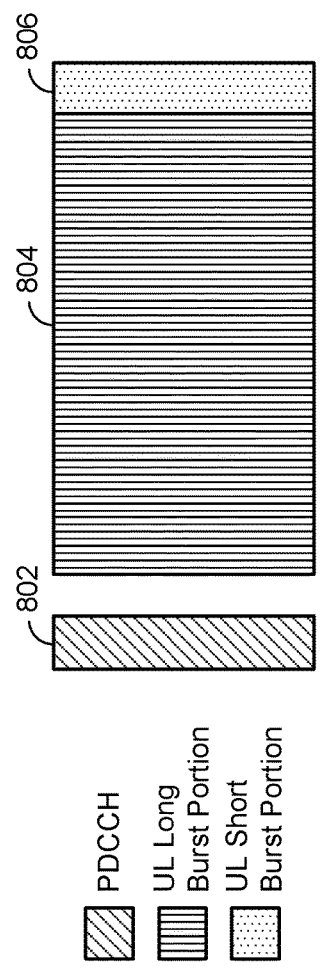
FIG. 8 is a diagram illustrating an example of an uplink (UL)-centric subframe, in accordance with certain aspects of the present disclosure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

In certain communication systems (e.g., LTE), a UE and a base station may utilize a passive scheduling request scheme for communications. In the passive scheduling request scheme, a UE may configure the scheduling request based at least in part on a set of pre-configured parameters determined based at least in part on radio resource control (RRC) signaling. Based at least in part on the set of pre-configured parameters, the UE may determine a resource allocation for the scheduling request; an offset, periodicity, and time location for the scheduling request; a maximum quantity of scheduling request retransmissions to attempt; a prohibit timer threshold (e.g., a threshold period of time before a retransmission of a scheduling request may be attempted); and/or the like. The UE may transmit the scheduling request to the base station, and may receive an uplink grant as a response from the base station.

However, in some cases, the UE may not receive the uplink grant from the base station. In a first case, the base station may fail to receive the scheduling request and may not transmit an uplink grant based at least in part on failing to receive the scheduling request. In the first case, it may be desirable to immediately retransmit the scheduling request to ensure that the base station receives the scheduling request without excessive delay. In contrast, in a second case, the base station may receive the scheduling request, but may lack resources to immediately provide an uplink grant to the UE. In the second case, the base station may delay transmitting information to the UE until network resources are available to provide an uplink grant to the UE. In the second case, it may be desirable to delay retransmission of the scheduling request to enable the base station to provide the uplink grant without a retransmission of the scheduling request causing excessive utilization of network resources.

However, in each case in the passive scheduling request scheme, the UE may delay retransmission of the scheduling request until a threshold period of time has elapsed (e.g., expiration of the prohibit timer threshold) based at least in part on lacking information to distinguish the first case and the second case. Using a delay period greater than a first threshold (e.g., a relatively long period) may reduce utilization of network resources in the second case, but may cause excessively delayed communications for a UE in the first case. In contrast, using a delay period less than a second threshold (e.g., a relatively short period) may reduce a likelihood of delay for the first case, but may cause excessive network loading for a physical uplink control channel resulting from excessive scheduling request retransmissions in the second case.

Some aspects, described herein, may enable an active scheduling request scheme for communications. For example, a UE may transmit a scheduling request to a base station, and the base station may provide an immediate response message to the UE based at least in part on receiving the scheduling request (e.g., a response message provided within a threshold period of time). The response message may include an uplink grant or an acknowledgement message indicating that a subsequent message is to be provided by the base station to convey the uplink grant. If the response message includes the uplink grant, the UE may proceed to use the uplink grant for communication. If the response message includes the acknowledgement message, the UE may suppress retransmission of the scheduling request, and may receive an uplink grant from the base station at a subsequent time and without retransmission of the scheduling request. In this way, a UE is notified that a base station has received a scheduling request, thereby reducing network traffic associated with retransmission of a scheduling request. In some aspects, described herein, based at least in part on failing to receive the response message, the UE may retransmit the scheduling request in less than a threshold period of time. In this way, based at least in part on failing to receive a notification that the base station has received the scheduling request, a UE may retransmit a scheduling request without waiting for a delay period to expire, thereby reducing a delay associated with obtaining an uplink grant.

Figure 9:
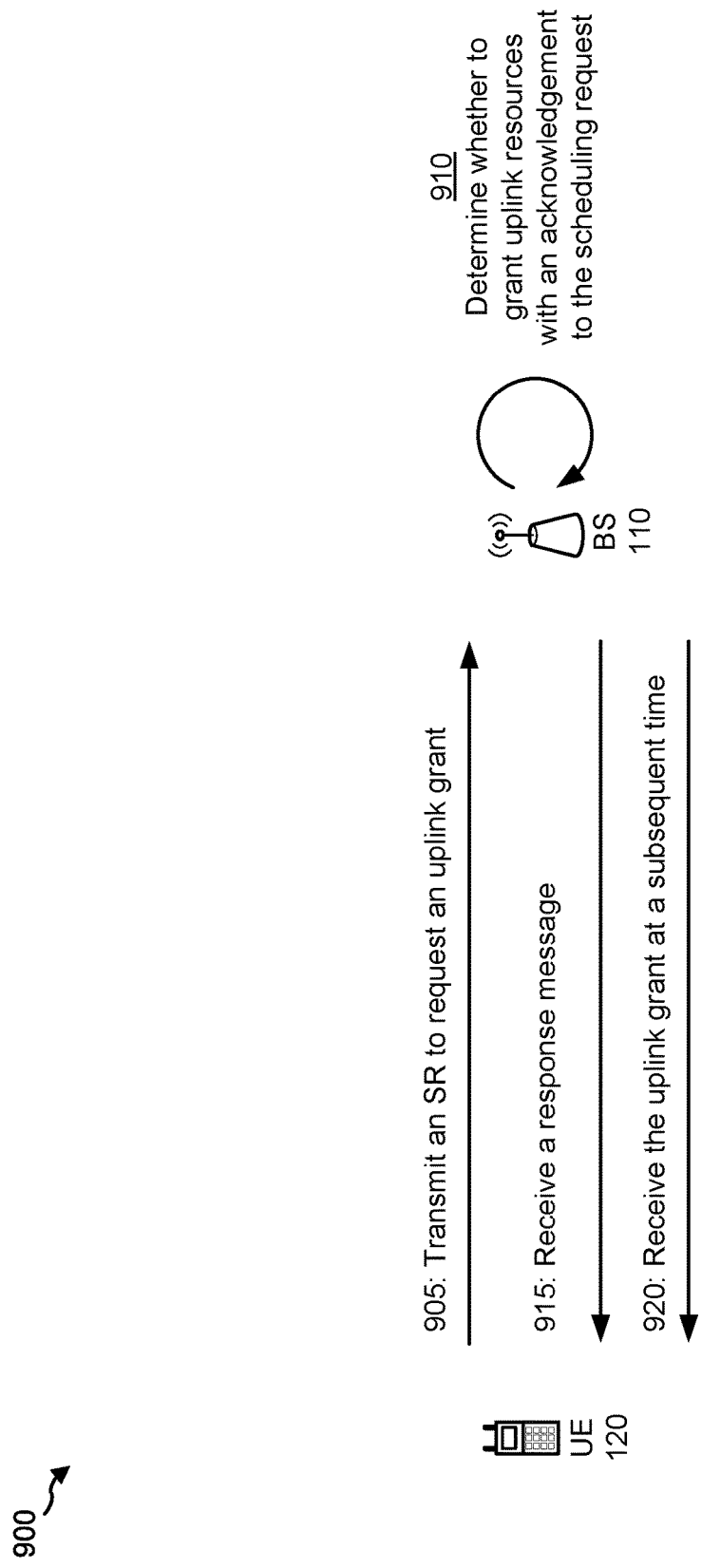
FIG. 9 is a diagram illustrating an example of scheduling request acknowledgement, in accordance with various aspects of the present disclosure.

FIG. 9 is a diagram illustrating an example 900 of scheduling request acknowledgement, in accordance with various aspects of the present disclosure. As shown in FIG. 9, example 900 includes a BS 110 and a UE 120.

As further shown in FIG. 9, and by reference number 905, UE 120 may transmit a scheduling request (SR) to BS 110 to request an uplink grant. For example, UE 120 may transmit, when operating in an ultra-reliable low latency communications deployment, a buffer status report (BSR) identifying a size of an uplink buffer to request the uplink grant to communicate data associated with the uplink buffer. In another example, UE 120 may transmit, when operating in an ultra-reliable low latency communications deployment, a scheduling request to BS 110, based on which BS 110 may determine a size of an uplink buffer at UE 120 by pre-configuration. In this case, BS 110 may receive the scheduling request from UE 120. As shown by reference number 910, after receiving the scheduling request, BS 110 may determine whether to transmit, as a response to the scheduling request, a response message including an acknowledgement message and an uplink grant or a response message including an acknowledgement message and without an uplink grant. For example, based at least in part on determining an availability of uplink resources for UE 120, BS 110 may determine to transmit a response message identifying an uplink grant for UE 120. In this case, based at least in part on UE 120 receiving the response message and decoding the uplink grant, UE 120 may use the uplink grant for communication. In some aspects, the uplink grant may include an assignment of uplink resources or may lack an assignment of uplink resources. For example, in some aspects, BS 110 may determine whether to transmit an uplink grant as an immediate (e.g., within less than a threshold period of time) acknowledgement of receipt of the scheduling request, and the uplink grant may or may not include an assignment of uplink resources.

In some aspects, BS 110 may determine to transmit the acknowledgement message. For example, based at least in part in determining that uplink resources are allocated to one or more other UEs, BS 110 may determine to transmit the acknowledgement message to UE 120 to indicate that BS 110 received the scheduling request, and to indicate that an uplink grant is to be provided at a subsequent time (e.g., when uplink resources are available for UE 120). In this way, BS 110 may transmit an acknowledgement of the scheduling request to UE 120 to enable UE 120 to suppress retransmission of the scheduling request, thereby reducing a utilization of network resources.

As further shown in FIG. 9 and by reference number 915, BS 110 may provide, and UE 120 may receive the response message including the acknowledgement message. In some aspects, BS 110 may provide, and UE 120 may receive the response message using PDCCH resources. In some aspects, the response message includes a downlink control information (DCI) message. For example, BS 110 may transmit a DCI type 0 (DCI-0) message, which may include a flag indicating that the DCI-0 message is to acknowledge the scheduling request (e.g., a flag indicating that the DCI message is a DCI-0 message for acknowledging the scheduling request). In some aspects, the DCI-0 message includes a bit to indicate a type of response message (e.g., an ultra-reliable low latency communications (URLLC) response message). For example, the DCI-0 message may include a first bit indicator to indicate that the response message includes the uplink grant. Alternatively, the DCI-0 message may include a second bit indicator to indicate that the response message does not include the uplink grant. In some aspects, a type of the response message (e.g., a URLLC response message) is determined based at least in part on the RNTI used to scramble a CRC of a DCI message; based at least in part on a bit mask applied to the CRC; based at least in part on a common/UE-specific search space at which the DCI is located; based at least in part on a size of the DCI payload; based at least in part on a predefined set of fields in the DCI message where the DCI is considered to include the response message if the set of fields have certain preconfigured values; and/or the like. In some aspects, BS 110 may transmit a DCI message of other types (e.g., a fallback type or a non-fallback type) that includes a response message and/or an uplink grant to UE 120. In some aspects, UE 120 may utilize the grant in a current subframe (e.g., a subframe associated with the DCI-0 message. Alternatively, UE 120 may utilize the grant in a subsequent subframe. In this case, UE 120 may select the subsequent subframe based at least in part on an indication of the subsequent subframe received in connection with the uplink grant.

In some aspects, the acknowledgement message may include an identifier of a time at which the uplink grant is to be provided. For example, BS 110 may transmit an acknowledgement message indicating a particular mini-slot of a plurality of mini-slots at which BS 110 is to transmit the uplink grant, and UE 120 may receive the uplink grant at the particular mini-slot based at least in part on BS 110 transmitting the uplink grant at the particular mini-slot. In some aspects, the acknowledgement message may lack an indication of a time at which the uplink grant is to be provided. In this case, UE 120 may monitor a plurality of mini-slots subsequent to receiving the acknowledgement message to detect a subsequent response message including the uplink grant. In this case, after failing to detect the uplink grant in a threshold quantity of time (e.g., after monitoring a threshold quantity of mini-slots), UE 120 may time out and may transmit a retransmission of the scheduling request to request the uplink grant. In some aspects, the time out period may be determined based at least in part on an estimated transmission and response time for scheduling requests (e.g., a pre-configured estimation or a dynamic estimation). In this way, BS 110 can delay providing the uplink grant to a subsequent time without excessive network traffic caused by retransmissions of the scheduling request before a threshold period of time has elapsed.

In some aspects, UE 120 may transmit a retransmission of the scheduling request to BS 110. For example, based at least in part on a threshold period of time elapsing without receiving the response message (e.g., based at least in part on BS 110 failing to receive the scheduling request and failing to transmit a response message, based at least in part on BS 110 transmitting the response message and UE 120 failing to receive the response message, based at least in part on BS 110 transmitting the response message and UE 120 failing to decode the response message, and/or the like), UE 120 may transmit the retransmission of the scheduling request to request the uplink grant. In some aspects, the threshold period of time may be less than a prohibit timer or a scheduling request period, thereby reducing a delay associated with obtaining an uplink grant relative to a passive scheduling request scheme.

In some aspects, UE 120 may transmit the retransmission of the scheduling request based at least in part on failing to decode an uplink grant included in the response message. For example, when BS 110 transmits a response message that includes an uplink grant and UE 120 fails to decode the uplink grant in the response message, UE 120 may transmit a retransmission of the scheduling request (e.g., before expiration of a threshold period of time associated with a prohibit timer or before expiration of a scheduling request period). Similarly, based at least in part on failing to decode the acknowledgement message to determine that BS 110 is acknowledging receipt of the scheduling request, UE 120 may transmit a retransmission of the scheduling request. In some aspects, BS 110 may transmit a response message as a response to a retransmission of the scheduling request, such as a response message including an uplink grant, a response message including an acknowledgement indicating that an uplink grant is to be subsequently provided, and/or the like.

In some aspects, UE 120 may utilize different resources after a transmission. For example, after transmission of the scheduling request, UE 120 may utilize first PUSCH resources (e.g., a first modulation and coding scheme (MCS), a first transport block size (TBS), a first power control parameter, a first resource allocation, etc.) after transmitting a scheduling request, and second PUSCH resources (e.g., a second MCS, a second TBS, a second power control parameter, a second resource allocation, etc. to accommodate a reduced delay budget) after retransmitting the scheduling request. In some aspects, PUSCH resources for use by UE 120 may be pre-configured.

As further shown in FIG. 9, and by reference number 920, at a subsequent time, BS 110 may transmit, and UE 120 may receive the uplink grant. For example, after transmitting the response message including the acknowledgement indicating that BS 110 will provide the uplink grant at a subsequent time, BS 110 may provide the uplink grant, and UE 120 may use the uplink grant for communication. In some aspects, the uplink grant is associated with a resource block assignment and a hopping resource allocation of a PUSCH at a specified time location. Additionally, or alternatively, the uplink grant may be associated with a resource block allocation configured in an RRC message.

In some aspects, UE 120 may retransmit the scheduling request based at least in part on failing to receive the uplink grant. For example, after a threshold period of time elapses from receiving a response message, which includes the acknowledgement message, without UE 120 receiving the uplink grant (e.g., without BS 110 transmitting the uplink grant, without UE 120 decoding the uplink grant that is provided, etc.), UE 120 may retransmit the scheduling request to request an uplink grant. In this case, BS 110 may provide a response message as a response to the retransmission of the scheduling request including an uplink grant or an acknowledgement message.

As indicated above, FIG. 9 is provided as an example. Other examples are possible and may differ from what was described with respect to FIG. 9.

FIG. 10 is a diagram illustrating an example process 1000 performed, for example, by a user equipment, in accordance with various aspects of the present disclosure. Example process 1000 is an example where a user equipment (e.g., UE 120) performs uplink grant acquisition based at least in part on a scheduling request acknowledgement message.

As shown in FIG. 10, in some aspects, process 1000 may include transmitting a scheduling request to a base station (block 1010). For example, the user equipment (e.g., using controller/processor 280, transmit processor 264, TX MIMO processor 266, MOD 254, antenna 252, and/or the like) may transmit the scheduling request to the base station using PUSCH resources allocated for transmitting the scheduling request, as described above.

As further shown in FIG. 10, in some aspects, process 1000 may include monitoring for an ultra-reliable low latency communications type of response message from the base station based at least in part on transmitting the scheduling request to the base station (block 1020). For example, the user equipment (e.g., using antenna 252, DEMOD 254, MIMO detector 256, receive processor 258, controller/processor 280, and/or the like) may receive a response message including an acknowledgement message indicating that an assignment of uplink resources is to be provided after the response message is provided, and the acknowledgement message may be used to suppress retransmission of the scheduling request, as described above. Additionally, or alternatively, the user equipment (e.g., using antenna 252, DEMOD 254, MIMO detector 256, receive processor 258, controller/processor 280, and/or the like) may receive a response message including an acknowledgement message indicating that an assignment of uplink resources is provided, as described above.

Process 1000 may include additional aspects, such as any single aspect or any combination of aspects described below and/or in connection with one or more other processes described elsewhere herein.

In some aspects, the response message includes an indicator of an assignment of uplink resources for the user equipment or that the assignment of uplink resources is delayed. In some aspects, based at least in part on the monitoring, the user equipment avoids retransmission of the scheduling request when the response message is detected or retransmits the scheduling request without delay when the response message is not detected.

In some aspects, the response message comprises an uplink grant message that does not allocate uplink resources for the user equipment when the indicator indicates that the assignment of uplink resources is delayed. In some aspects, the uplink grant message indicates a time location for subsequent monitoring for the assignment of uplink resources. In some aspects, the response message is received using physical downlink control channel resources.

In some aspects, a retransmission of the scheduling request is transmitted to the base station to request the assignment of uplink resources within a threshold period of time of transmitting the scheduling request and the threshold period is less than a scheduling request period. In some aspects, a retransmission of the scheduling request is transmitted based at least in part on the assignment of uplink resources not being decoded by the user equipment, the response message not being decoded by the user equipment, and/or the like. In some aspects, a retransmission of the scheduling request is transmitted based at least in part on the scheduling request not being received by the base station or the response message not being received by the user equipment.

In some aspects, the response message includes an identifier of a time at which the assignment of uplink resources is to be provided, and the user equipment is configured to monitor for the assignment of uplink resources at the time identified by the response message. In some aspects, the indicator indicates at least one subsequent mini-slot of a plurality of subsequent mini-slots for monitoring. In some aspects, a retransmission of the scheduling request is transmitted based at least in part on the assignment of uplink resources not being received within a threshold period of time. In some aspects, another response message includes the assignment of uplink resources, the assignment of uplink resources is associated with a resource block assignment and hopping resource allocation of a PUSCH at a specified time location, and the assignment of uplink resources is associated with a resource block assignment configured in an RRC message.

In some aspects, the response message is provided in a downlink control information type 0 (DCI-0) message. In some aspects, the response message is provided in at least one of a downlink control information type 0 (DCI-0) message, a fallback downlink control information type 0, a non-fallback downlink control information type 0, a DCI message wherein a cyclic redundancy check (CRC) is scrambled based at least in part on a radio network temporary identifier, a DCI message wherein a CRC is masked based at least in part on a particular bit pattern, a DCI message associated with a particular size, a DCI message decoded in a particular common or UE-specific search space, or a set of fields of a DCI message that include a particular set of values. In some aspects, the response message is configured to include a bit for an indicator selected from a first indicator to indicate that the response message includes the assignment of uplink resources, a second indicator to indicate that the response message does not include the assignment of uplink resources, and/or the like.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a base station, in accordance with various aspects of the present disclosure. Example process 1100 is an example where a base station (e.g., BS 110) performs scheduling request acknowledgement.

As shown in FIG. 11, in some aspects, process 1100 may include receiving a scheduling request from a user equipment (block 1110). For example, the base station (e.g., using antenna 234, DEMOD 232, MIMO detector 236, receive processor 238, controller/processor 240, and/or the like) may receive the scheduling request from the user equipment to request an allocation of network resources for the user equipment, as described above.

As further shown in FIG. 11, in some aspects, process 1100 may include transmitting a response message to the user equipment based at least in part on receiving the scheduling request from the user equipment (block 1120). For example, the base station (e.g., using controller/processor 240, transmit processor 220, TX MIMO processor 230, MOD 232, antenna 234, and/or the like) may transmit a response message including an indicator indicating that an assignment of uplink is to be provided after the response message is provided, and the acknowledgement message may be used to suppress retransmission of the scheduling request by the user equipment, as described above. Additionally, or alternatively, the base station (e.g., using controller/processor 240, transmit processor 220, TX MIMO processor 230, MOD 232, antenna 234, and/or the like) may transmit a response message including an indicator indicating an assignment of uplink resources, as described above.

Process 1100 may include additional aspects, such as any single aspect or any combination of aspects described below and/or in connection with one or more other processes described elsewhere herein.

In some aspects, the response message includes an indicator indicating an assignment of uplink resources or that an assignment of uplink resources is to be provided after the response message is provided. In some aspects, the response message is to suppress retransmission of the scheduling request.

In some aspects, the response message includes another indicator that the response message is an ultra-reliable low latency communications (URLLC) response message. In some aspects, the response message includes a flag indicating that the response message does not include the assignment of uplink resources. In some aspects, the response message is configured to include a bit for an indicator selected from a first indicator to indicate that the response message includes the assignment of uplink resources, a second indicator to indicate that the response message does not include the assignment of uplink resources, and/or the like. In some aspects, the response message is transmitted using physical downlink control channel resources.

In some aspects, a retransmission of the scheduling request is received to request the assignment of uplink resources within a threshold period of time of transmission of the scheduling request, and the threshold period of time is less than a scheduling request period. In some aspects, a retransmission of the scheduling request is received based at least in part on the assignment of uplink resources not being decoded, the response message not being received, the response message not being decoded, and/or the like. In some aspects, the response message includes an identifier of a time at which the assignment of uplink resources is to be provided, and the assignment of uplink resources is transmitted at the time identified by the response message.

In some aspects, the assignment of uplink resources is transmitted in at least one subsequent mini-slot of a plurality of subsequent mini-slots. In some aspects, a retransmission of the scheduling request is transmitted based at least in part on the assignment of uplink resources not being received within a threshold period of time, and another response message is transmitted to the user equipment based at least in part on the retransmission of the scheduling request. In some aspects, another response message includes the assignment of uplink resources, and the assignment of uplink resources is associated with a resource block assignment and hopping resource allocation of a PUSCH at a specified time location or the assignment of uplink resources is associated with a resource block assignment configured in an RRC message. In some aspects, a first set of PUSCH resources is utilized for an uplink data transmission triggered by the response message to the scheduling request, and a second set of PUSCH resources that is different from the first set of PUSCH resources is utilized for another uplink data transmission triggered by another response message to a retransmission of the scheduling request.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communications performed by a user equipment, comprising:
    transmitting a scheduling request to a base station; and
    monitoring for an ultra-reliable low latency communications type of response message from the base station based at least in part on transmitting the scheduling request to the base station,
        wherein the response message includes an indicator of an assignment of uplink resources for the user equipment or that the assignment of uplink resources is delayed,
        wherein, based at least in part on the monitoring, the user equipment avoids retransmission of the scheduling request when the response message is detected or retransmits the scheduling request without delay when the response message is not detected, and
        wherein the response message indicates a time location for subsequent monitoring for the assignment of uplink resources when the indicator indicates that the assignment of uplink resources is delayed.

2. The method of claim 1, wherein the response message comprises an uplink grant message that does not allocate uplink resources for the user equipment when the indicator indicates that the assignment of uplink resources is delayed.

3. The method of claim 2, wherein the uplink grant message indicates the time location for subsequent monitoring for the assignment of uplink resources.

4. The method of claim 1, wherein the response message is received using physical downlink control channel resources.

5. The method of claim 1, wherein a retransmission of the scheduling request is transmitted to the base station to request the assignment of uplink resources within a threshold period of time of transmitting the scheduling request, the threshold period of time being less than a scheduling request period.

6. The method of claim 1, wherein a retransmission of the scheduling request is transmitted based at least in part on:
    the assignment of uplink resources not being decoded by the user equipment, or
    the response message not being decoded by the user equipment.

7. The method of claim 1, wherein a retransmission of the scheduling request is transmitted based at least in part on the scheduling request not being received by the base station or the response message not being received by the user equipment.

8. The method of claim 1, wherein the response message includes an identifier of the time location at which the assignment of uplink resources is to be provided; and
    wherein the user equipment is configured to monitor for the assignment of uplink resources at the time location identified by the response message.

9. The method of claim 1, wherein the indicator indicates at least one subsequent mini-slot of a plurality of subsequent mini-slots for monitoring.

10. The method of claim 1, wherein a retransmission of the scheduling request is transmitted based at least in part on the assignment of uplink resources not being received within a threshold period of time.

11. The method of claim 1, wherein another response message includes the assignment of uplink resources; and
    wherein the assignment of uplink resources is associated with a resource block assignment and hopping resource allocation of a PUSCH at a specified time location, or
    wherein the assignment of uplink resources is associated with a resource block assignment configured in an RRC message.

12. The method of claim 1, wherein the response message is provided in at least one of:
    a downlink control information type 0 (DCI-0) message,
    a fallback downlink control information type 0,
    a non-fallback downlink control information type 0,
    a DCI message wherein a cyclic redundancy check (CRC) is scrambled based at least in part on a radio network temporary identifier,
    a DCI message wherein a CRC is masked based at least in part on a particular bit pattern,
    a DCI message associated with a particular size,
    a DCI message decoded in a particular common or UE-specific search space, or
    a set of fields of a DCI message that include a particular set of values.

13. The method of claim 1, wherein the response message is configured to include a bit for an indicator selected from:
    a first indicator to indicate that the response message includes the assignment of uplink resources, or
    a second indicator to indicate that the response message does not include the assignment of uplink resources.

14. A method of wireless communications performed by a base station, comprising:
    receiving a scheduling request from a user equipment; and transmitting a response message to the user equipment based at least in part on receiving the scheduling request from the user equipment,
  wherein the response message includes an indicator indicating an assignment of uplink resources or that the assignment of uplink resources is to be provided after the response message is provided,
  wherein the response message is to suppress retransmission of the scheduling request, and
  wherein the response message indicates a time location for subsequent monitoring for the assignment of uplink resources when the indicator indicates that the assignment of uplink resources is to be provided after the response message is provided.

15. The method of claim 14, wherein the response message includes another indicator that the response message is an ultra-reliable low latency communications (URLLC) response message.

16. The method of claim 14, wherein the response message includes a flag indicating that the response message does not include the assignment of uplink resources.

17. The method of claim 14, wherein the response message is configured to include a bit for an indicator selected from:
  a first indicator to indicate that the response message includes the assignment of uplink resources, or
  a second indicator to indicate that the response message does not include the assignment of uplink resources.

18. The method of claim 14, wherein the response message is transmitted using physical downlink control channel resources.

19. The method of claim 14, wherein a retransmission of the scheduling request is received to request the assignment of uplink resources within a threshold period of time of transmission of the scheduling request,
  the threshold period of time being less than a scheduling request period.

20. The method of claim 14, wherein a retransmission of the scheduling request is received based at least in part on:
  the assignment of uplink resources not being decoded,
  the response message not being received, or
  the response message not being decoded.

21. The method of claim 14, wherein the response message includes an identifier of the time location at which the assignment of uplink resources is to be provided; and
  wherein the assignment of uplink resources is transmitted at the time location identified by the response message.

22. The method of claim 14, wherein the assignment of uplink resources is transmitted in at least one subsequent mini-slot of a plurality of subsequent mini-slots.

23. The method of claim 14, wherein a retransmission of the scheduling request is transmitted based at least in part on the assignment of uplink resources not being received within a threshold period of time; and
  wherein another response message is transmitted to the user equipment based at least in part on the retransmission of the scheduling request.

24. The method of claim 14, wherein another response message includes the assignment of uplink resources; and
  wherein the assignment of uplink resources is associated with a resource block assignment and hopping resource allocation of a PUSCH at a specified time location, or
  wherein the assignment of uplink resources is associated with a resource block assignment configured in an RRC message.

25. The method of claim 14, wherein a first set of PUSCH resources is utilized for an uplink data transmission triggered by the response message to the scheduling request; and
  wherein a second set of PUSCH resources that is different from the first set of PUSCH resources is utilized for another uplink data transmission triggered by another response message to a retransmission of the scheduling request.

26. A user equipment, comprising:
  a memory;
  one or more processors coupled to the memory, the memory and the one or more processors configured to:
    transmit a scheduling request to a base station; and
    monitor for an ultra-reliable low latency communications type of response message from the base station based at least in part on transmitting the scheduling request to the base station,
      wherein the response message includes an indicator of an assignment of uplink resources for the user equipment or that the assignment of uplink resources is delayed,
      wherein, based at least in part on the monitoring, the user equipment avoids retransmission of the scheduling request when the response message is detected or retransmits the scheduling request without delay when the response message is not detected, and
      wherein the response message indicates a time location for subsequent monitoring for the assignment of uplink resources when the indicator indicates that the assignment of uplink resources is delayed.

27. The user equipment of claim 26, wherein the response message comprises an uplink grant message that does not allocate uplink resources for the user equipment when the indicator indicates that the assignment of uplink resources is delayed.

28. The user equipment of claim 27, wherein the uplink grant message indicates the time location for subsequent monitoring for the assignment of uplink resources.

29. A base station, comprising:
  a memory;
  one or more processors coupled to the memory, the memory and the one or more processors configured to:
    receive a scheduling request from a user equipment; and
    transmit a response message to the user equipment based at least in part on receiving the scheduling request from the user equipment,
      wherein the response message includes an indicator indicating an assignment of uplink resources or that an assignment of uplink resources is to be provided after the response message is provided,
      wherein the response message is to suppress retransmission of the scheduling request, and
      wherein the response message indicates a time location for subsequent monitoring for the assignment of uplink resources when the indicator indicates that the assignment of uplink resources is to be provided after the response message is provided.

30. The base station of claim 29, wherein the response message includes another indicator that the response message is an ultra-reliable low latency communications (URLLC) response message.

* * * * *